Oct. 1, 1935.　　　P. SCHOWALTER　　　2,015,820
BOX SHAPED SPRING
Filed April 27, 1934　　2 Sheets-Sheet 1

Oct. 1, 1935. P. SCHOWALTER 2,015,820
BOX SHAPED SPRING
Filed April 27, 1934  2 Sheets-Sheet 2

Patented Oct. 1, 1935

2,015,820

UNITED STATES PATENT OFFICE 2,015,820

BOX-SHAPED SPRING

Peter Schowalter, Hagen, Germany, assignor to Ernst Pulvermacher, Hagen-Haspe, Germany Application April 27, 1934, Serial No. 722,739
In Germany April 26, 1933

5 Claims. (Cl. 267—1)

This invention relates to a spring element, which comprises an inner split annular spring and two opposite outer rings, which mutually contact with conical surfaces and have for their object to absorb the pressure—and thrust forces in order to partly annihilate by friction the taken up working forces in the case of recoil.

The invention differs from known spring elements of this type substantially in that the outer springs are of conical shape with uniform wall thickness, and that the free end pieces of these springs are bent or folded inwards radially to form guide hubs for constructional elements, onto which the spring elements are slipped, for example the rod of a buffer. Thus, the outer spring parts are positively centrally guided without the employment of separate auxiliary means. This construction also presents the advantage that in the zone of the maximum compression stress, that is when the spring element is most contracted, a reinforcement is produced by the hub on the most stressed point of the outer spring element.

Several embodiments of the invention are illustrated by way of example in the accompanying drawings in which:—

Figure 1:
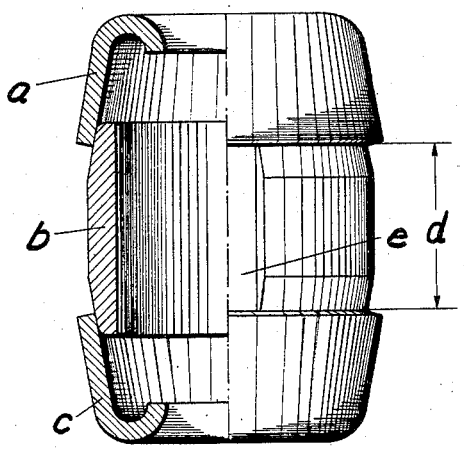
Fig. 1 shows a spring in non-stressed condition partly in elevation and partly in longitudinal section.
Figure 2:
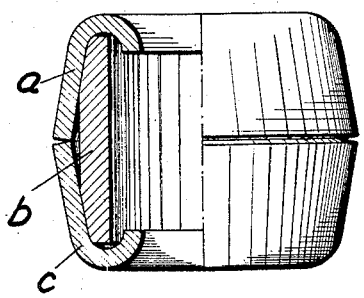
Fig. 2 is a similar view of the spring in compressed condition.
Figure 3:
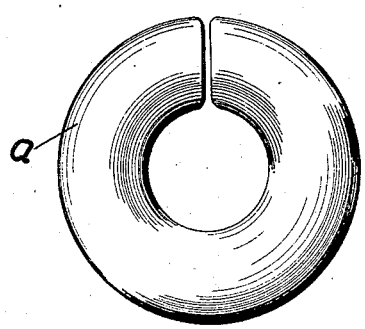
Fig. 3 is a top plan view.

According to Figs. 1 to 3 the spring comprises a spring cover $a$, a spring body $b$, and a spring bottom $c$. The spring cover $a$ and the similarly shaped spring bottom $c$ engage over the corresponding edges of the spring body $b$ conical at a similar angle and they are mutually adapted so that a working path $d$ is left between the edges of the cover $a$ and the bottom $d$.

The bores of the cover and bottom may be provided with hubs for the purpose of centering and guiding (Figs. 10 and 11); the two parts may be slit so that they add to the resiliency (Fig. 3), The spring body $b$ which is generally cylindrical, is open at both ends. If a spring element such as illustrated in Fig. 1 is subjected to pressure, the spring body $b$ is compressed radially corresponding to the conical surfaces until either the split gap $e$ of the spring body is closed or the edges of the cover $a$ and bottom $c$ come into contact, or the edges of the spring body $b$ bear against the inner faces of the cover $a$ and bottom $c$, or when all these positions are reached at the same time.

During the compression of the spring frictional work is done between the interengaging edges of the cover $a$, the spring body $b$ and the bottom $c$ so that, during the recoil of the spring the accumulated forces are effectively braked and for the greatest part used up.

The force accumulation of the spring is dependent upon the bending resistance of the spring body, and the frictional work upon the angle of the cone.

By suitably selecting the cross-sections the spring can be adapted to any degree of force.

Figure 4:
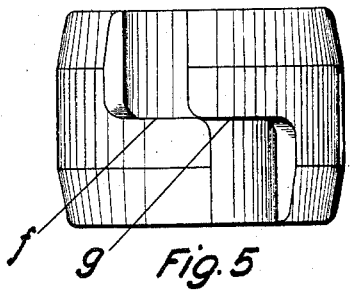
Figs. 4 to 6 show each in elevation a spring core of modified form of construction.
Figure 5:
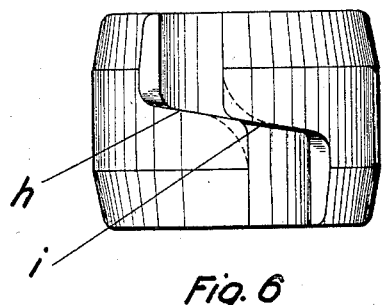

The working path may amount to 45% of the constructional height. The force accumulation of the spring according to Figs. 1 to 3 is proportional to the movement of the spring. In Fig. 4 a spring body is shown which has a stepped gap. The object of this arrangement is, to protect thin walled spring bodies against torsions and vertical shifting in the case of twisting thrust movements. If this spring body is subjected to pressure, the surfaces $f$ and $g$ slide the one on the other and thus support the spring body. Fig. 5 shows a similar arrangement with the difference that herein the guide surfaces are obliquely arranged and form a wedge. When the spring body is compressed, the wedge surfaces slide one on the other and shift the spring body in vertical direction, so that a torsion effect is produced which is identical with an increase in force. The amount of the increase in force is dependent upon the pitch of the wedge surfaces $h$ and $i$. In order to obtain a more gentle initial resiliency with this spring body, the sliding surfaces can be rounded. The wedge effect only begins to act when the spring body has been compressed radially so much that the wedge surfaces contact again.

The amplitude of movement of the preliminary resiliency can be determined by more or less pronounced rounding of the wedge surfaces. By means of the wedge shaped sliding faces an additional increase in strength is imparted to the spring body which becomes operative at a desired point.

Figure 6:
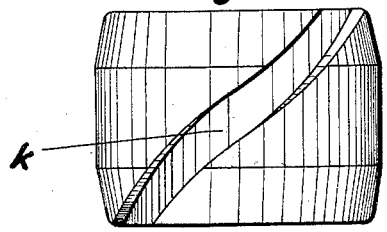

A further practical arrangement is the inclined gap k as shown in Fig. 6. By this arrangement the spring body when being compressed carries out a rotating movement so that it screws its way into the cover and bottom. This turning movement is braked during the return movement of the spring, the spring body being therefore compelled to creep radially between the spring cover and spring bottom.

By this positive creeping of the spring body uniform wear of all contacting friction surfaces is attained.

Figure 7:
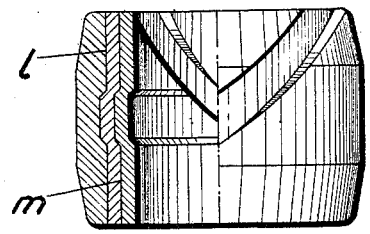
Figs. 7 and 8 show two other forms of construction of the spring.

Fig. 7 shows another construction of the spring body for meeting particularly exigent requirements. The spring body consists of several layers pressed one within the other with preliminary tension. These layers may be of different thicknesses and have mutually intersecting oblique gaps. The individual layers are protected against longitudinal displacement by key and groove.

The object of the arrangement is to obtain the highest possible flection and friction moment. If a spring body as illustrated in Fig. 7 is subject to pressure, friction will be suppressed not only between the conical sliding surfaces but also between the surfaces $l$ and $m$ of the individual layers. Owing to the intersecting arrangement of the spring gaps registering of the spring gaps and at the same time the elimination of the friction between the individual layers are avoided.

Figure 8:
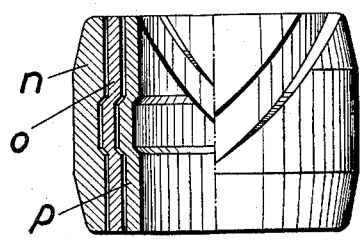

Fig. 8 shows a similar arrangement only with the difference that here the individual layers of the spring body are at a distance the one from the other. If such a spring body is subjected to pressure, this pressure will first be taken up by the spring body $n$, if the pressure continues to act it is taken up by the layer $o$ and finally by the layer $p$. Thus, the absorption of the force takes place in steps. The intersecting arrangement of the oblique spring gaps is of great importance also in this construction.

Figure 9:
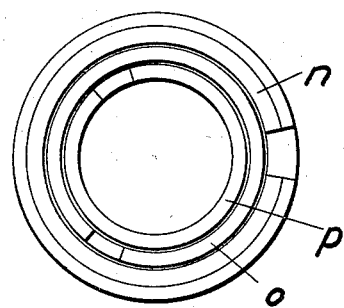
Fig. 9 shows in top plan view a spring body composed of several layers.

Fig. 9 is a top plan view of a spring body composed of several layers.

Figure 10:
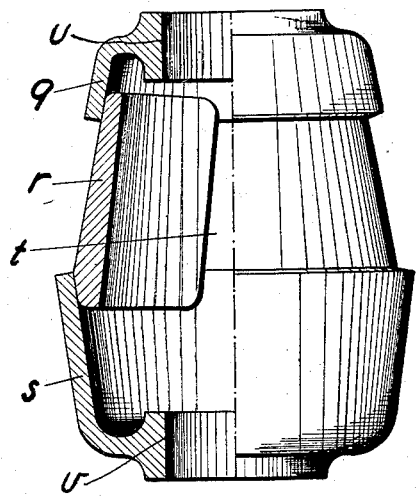
Figs. 10 and 11 show in elevation partly in section another modified form of the box-shaped spring in the two extreme positions.

In Fig. 10 another form of construction of the friction spring in box-shape is illustrated. The drawings show the spring in elevation in uncompressed condition, the left half being in axial section.

Figure 11:
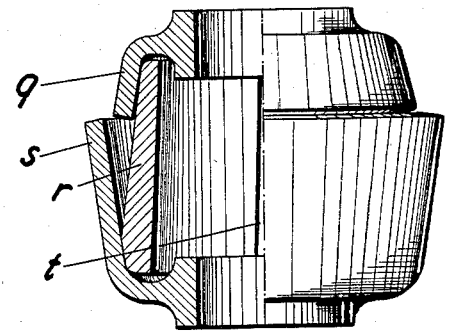
Figure 12:
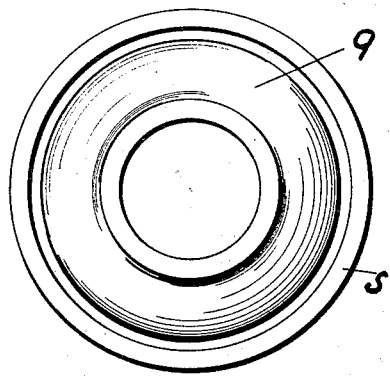
Fig. 12 is a top plan view of Figs. 10 and 11.

Fig. 11 shows the spring in compressed condition and Fig. 12 is top plan view.

As can be seen from the drawings, this spring body $r$, according to this form of construction, has an inner continual conical surface, whereas the outer side is composed of two conical surfaces of different height and inclination. The cross section of the material is so chosen, that the same resistance against bending exists at the narrow and wide side of the spring body.

The spring cover $q$ and the spring bottom $s$ are adapted to the spring body $r$, the movement of the spring in the cover $q$ being much shorter than in the bottom $s$, the spring gap $t$ tapering corresponding to the spring movement. If such a spring element is subjected to pressure, it behaves in a different manner as the spring element shown in Fig. 1. As the pressure increases the spring cover $q$ first reaches the top end of the spring body $r$ because the working movement is here shorter; at the same time the spring gap $t$ is here closed. In the spring bottom $s$, however, the spring body $r$ will be further compressed until either the lower edge of the spring body reaches the base of the spring bottom $s$, or the spring gap is closed, or both phenomena occur at the same time.

During this procedure the conical spring body is pressed into a shape approaching the cylindrical, a torsion effect being produced. To enable this torsion effect or vertical displacement of the spring body, the edges and also the conical friction surfaces of the spring body are correspondingly shaped.

When pressure is removed from the spring the vertical displacement of the spring body acts energetically, in order to be also effectively braked as the returning movement progresses.

By this form of construction a gentle preliminary resiliency is attained, which after a certain movement is converted into an increase in force owing to the torsion effect. During the return movement of the spring an absolutely reliably acting detachment of the parts pressed the one into the others is introduced by the torsion effect, mutual binding of the parts being avoided.

To obtain an accurate guiding, for example on the buffer rod, the cover and the bottom are equipped with guide hubs $u$ and $v$ respectively.

I claim:—

1. A box-shaped spring, especially for buffer springs, comprising in combination an inner split ring bevelled at its two ends, two closed conical outer rings one at each end of said inner ring and each having a wall of uniform thickness, the wider ends of said outer ring each engaging over the adjacent bevelled end of said inner split ring and adapted to slide thereon when pressure is exerted on the narrow ends of said outer rings, and an inwardly curved annular portion formed on the narrow end of each of said outer rings, said inwardly bent portions each adapted to engage one edge of said inner ring to limit the displacement of said outer rings on said inner ring.

2. A spring as specified in claim 1, in which the inwardly curved portions and the walls of the outer rings are of uniform thickness, the curved portions being formed by bending inwards the narrow ends of the rings.

3. A spring as specified in claim 1, in which the two outer rings are of different height and consequently capable of sliding different distances over the inner ring.

4. A spring as specified in claim 1, in which the two outer rings are of different heights and have different conicities, the conicity of the lower ring being steeper than that of the higher ring.

5. A spring as specified in claim 1, in which the inner ring is split to form a wedge-shaped gap.

PETER SCHOWALTER.